United States Patent Office.

HENRY W. HOLLY, OF BROOKLYN, NEW YORK, ASSIGNEE OF JOHN W. HOARD, OF PROVIDENCE, RHODE ISLAND.

*Letters Patent No.* 16,687, *dated February* 24, 1857; *reissue No.* 3,095, *dated August* 25, 1868.

IMPROVEMENT IN MARKING-SLATES.

The Schedule referred to in these Letters Patent and making part of the same.

Specification of an Improvement in the Manufacture of Artificial Slates for Marking or Writing, applicable also to other purposes, the invention of JOHN W. HOARD, of the city and county of Providence, in the State of Rhode Island.

This improvement in the preparation or manufacture of artificial slates or tablets, and other like articles for marking or writing upon, consists in the use of liquid quartz or silex, and in combining with the same an oxide as a drying, anti-deliquescent, and coloring-substance, and in which connection it will suffice here only to specially refer to the oxide of zinc as the anti-deliquescent and coloring-substance employed. Likewise, the invention covers in a slate, tablet, or slated surface, of the description mentioned, subjecting the same before fully dry to a calendering process or roller-pressure for the purpose of obtaining a finer and harder finish to said surface.

The following is one mode in which said invention may be carried into practice:

Take liquid quartz made in any suitable manner, and which may be as described in works on chemistry, such, for instance, as found in Knapp's "Chemical Technology," pages 147, 148, 149, vol. ii, published by Lea & Blanchard, Philadelphia, 1849, and evaporate it to the consistency of thin cream.

To make a white sheet, slate, or tablet for writing or marking upon with a graphite pencil, it is preferred to mix with such soluble quartz three times its weight of the white oxide of zinc, and afterwards to knead these two substances rapidly together into a paste that may be spread on a sheet of pasteboard of the size designed for a slate or tablet, and the whole afterward run between a pair of smooth rollers to give a finer and harder finish to the surface when dry. In about twenty-four hours this soluble glass paste on the pasteboard is dry enough for use, if exposed to a temperature of about 60° Fahrenheit, and is found to adhere tenaciously to the pasteboard, forming a hard, smooth coating, or beautiful slate or slated surface for marking or writing upon with, say, an ordinary lead-pencil.

To make colored slates for marking with a slate or other pencil, a like process of manufacture may be adopted, only substituting for the white oxide of zinc any suitable coloring-substance or substances.

If desired, a colored paste may be put on one side of a sheet of pasteboard and a white paste on the other side thereof, thus forming a slate for writing or marking with two kinds of pencils; or said slate may be only coated on one side.

Said paste, for producing artificial slates or slated surfaces, may be put on wood, iron, and other materials or bodies, instead of pasteboard. It makes a very superior substitute for common blackboards in academies and schools, and the same may be put on to the surface or body designed to be covered by it with a brush by, say, diluting it to the proper consistence, which may be done with water, applying said diluted paste, and allowing it to dry in successive coats, or said paste may be otherwise applied and spread.

By using an oxide with the liquid quartz, the artificial slate or slated surface is made anti-deliquescent, or more indurate, and different colors given to it, according to the color of the oxide employed, or other coloring-matter may be substituted or added. A slate or tablet, blackboard, or other article of card or sheet-like character for marking or writing upon, may thus be produced by simply spreading the liquid quartz, or same combined with an oxide, to the thickness and consistency required, upon sheets of wood, iron, pasteboard, paper, or other suitable material, the same presenting a hard and fine slated surface ready for marking or writing upon by pencil, chalk, or other marker, with every facility for erasure by the application of moisture or rubbing.

What is here claimed, and desired to be secured by Letters Patent, is—

1. The use of liquid silex in the preparation or manufacture of artificial slates, tablets, blackboards, and other like articles for marking or writing upon.

2. The combination of an oxide as a drying, anti-deliquescent, and coloring-substance, with liquid quartz or silex, as a menstruum in the manufacture of artificial slates, substantially as specified.

3. An artificial slate or tablet, formed by spreading liquid quartz or silex, either separate or mixed with other materials, on a suitable surface or body, of card or sheet form, and, prior to being dried, calendering or rolling the same under pressure, essentially as herein set forth.

HENRY W. HOLLY.

Witnesses:

HENRY T. BROWN,

A. H. JOCELYN.